US012767835B2

(12) United States Patent
Stewart

(10) Patent No.: US 12,767,835 B2
(45) Date of Patent: Oct. 20, 2026

(54) SYSTEM AND COLORING PRODUCT FOR LANDSCAPING MATERIALS

(71) Applicant: Antoine Stewart, Athens, GA (US)

(72) Inventor: Antoine Stewart, Athens, GA (US)

( * ) Notice: Subject to any disclaimer, the term of this patent is extended or adjusted under 35 U.S.C. 154(b) by 863 days.

(21) Appl. No.: 17/494,959

(22) Filed: Oct. 6, 2021

(65) Prior Publication Data

US 2022/0325114 A1 Oct. 13, 2022

Related U.S. Application Data

(60) Provisional application No. 63/167,966, filed on Mar. 30, 2021.

(51) Int. Cl.

| | |
|---|---|
| ***C09D 5/14*** | (2006.01) |
| ***B05D 1/02*** | (2006.01) |
| ***C09D 7/20*** | (2018.01) |
| ***C09D 201/00*** | (2006.01) |
| ***G06V 20/00*** | (2022.01) |

(52) U.S. Cl.

CPC ................. *C09D 5/14* (2013.01); *B05D 1/02* (2013.01); *C09D 7/20* (2018.01); *C09D 201/00* (2013.01); *G06V 20/38* (2022.01)

(58) Field of Classification Search

CPC ... C09D 5/00; C09D 5/14; B05D 1/02; G06V 20/38

See application file for complete search history.

(56) References Cited

U.S. PATENT DOCUMENTS

| | | | | |
|---|---|---|---|---|
| 7,054,794 B2 * | 5/2006 | Brunt | G06T 19/20 | 703/1 |
| 7,258,922 B2 * | 8/2007 | Hesse | C09K 17/52 | 428/407 |
| 8,361,542 B2 * | 1/2013 | Miller | A01G 13/35 | 427/136 |

FOREIGN PATENT DOCUMENTS

AU 2007242916 A1 * 7/2008

* cited by examiner

*Primary Examiner* — Vickey Nerangis

(74) *Attorney, Agent, or Firm* — Brennan, Manna & Diamond, LLC

(57) ABSTRACT

The present invention relates to a coloring product and a system for producing the coloring product. The coloring product is used for coloring and dying outdoor landscaping materials that enables users to customize the look of their landscaping materials. Various embodiments of the system include a mixer for mixing one or more coloring agents, and water in a specified ratio for producing the coloring product. Additional materials such as a disinfectant and a fragrant agent can also be added to the coloring product. The coloring product can be used on outdoor landscaping such as mulch, rocks, etc., and can be applied to landscaping materials before installation or sprayed on retroactively. In one embodiment, a specialized computer system recommends a coloring product for the landscaping materials.

19 Claims, 7 Drawing Sheets

SYSTEM AND COLORING PRODUCT FOR LANDSCAPING MATERIALS

CROSS-REFERENCE TO RELATED APPLICATION

The present application claims priority to, and the benefit of, U.S. Provisional Application No. 63/167,966, which was filed on Mar. 30, 2021, and is incorporated herein by reference in its entirety.

FIELD OF THE INVENTION

The present invention relates generally to the field of chemical coloring products. More specifically, the present invention relates to a coloring product for outdoor landscaping materials that enables users to customize the look of their landscaping materials with ease. The invention includes various embodiments of the systems having a mixer to mix one or more paints or stains and water in a specified ratio to produce the coloring product. Additional materials such as a disinfectant and a fragrant agent can also be added to the coloring product. The coloring product can be used on outdoor landscaping such as mulch, rocks, etc. and can be applied to landscaping materials before installation (i.e. proactively) or sprayed on after the landscaping materials have been installed (i.e. retroactively). The invention enables users to create uniform landscaping materials with ease for an aesthetically pleasing look. Accordingly, the present disclosure makes specific reference thereto. Nonetheless, it is to be appreciated that aspects of the present invention are also equally applicable to other like applications, devices, and methods of manufacture.

BACKGROUND

By way of background, some individuals may enjoy placing mulch, gravel, pine straw and other landscaping materials around their home or business to improve aesthetics. A combination of these garden decorative materials in different proportions enables a user to achieve different decorative designs for their gardens and other outdoor locations. Different decorative materials are generally different in color and can be differentiated easily. However, with different colors of the materials, a proper aesthetic look for any particular area cannot be achieved. Individuals may desire to have uniform colored, dyed or stained designs for their gardens and other similar spaces, and may be left with an option of using a single type of material for decorating their gardens in order to ensure uniformness and an appealing look for gardens and outdoor spaces.

In situations where different kinds of materials, such as mulch, gravel, pine straw, pebbles and more, are used for decorating gardens and other similar outdoor spaces, individuals can find it difficult to ensure all material are of the same color or complimentary color.

Further, different materials may be impacted differently in various weather conditions. For example, colors of some decorative materials may wear quicker than others, thereby leaving some materials in different colors or shades than the rest. It can be extremely difficult to maintain all the materials in a uniform color or shade in order to make the area aesthetically appealing.

Furthermore, the look of conventional landscaping materials is fixed and individuals may be unable to customize the looks of the landscaping materials as per their desires and requirements. In situations where an individual desires to change the look of the landscaping materials, they have to buy different types and colors of landscaping materials to customize the look of the area. This can be expensive and individuals may be reluctant or prohibited from spending on such landscaping materials.

Therefore, there exists a long felt need in the art for a solution for enabling users to decorate gardens, homes or business aesthetics in uniform colors. There is also a long felt need in the art for a solution that enables the users to maintain uniform colors for different landscaping materials. Additionally, there is a long felt need in the art for a solution that makes it easy to color and install the landscaping materials with a consistent color, stain, or shade. Moreover, there is a long felt need in the art for a solution that enables the users to easily change the look of their landscaping materials as per their desires and requirements. Further, there is a long felt need in the art for a solution that eliminates the need to buy different landscaping materials to periodically change the look of their gardens, outdoor spaces, homes or business aesthetics. Furthermore, there is a long felt need in the art for a solution that enables the users to customize the look of landscaping materials placed in any area in a cost-effective manner. Finally, there is a long felt need in the art for a solution that is easy to use and ensures an aesthetically appealing look for gardens, outdoor spaces, homes, or business aesthetics.

The subject matter disclosed and claimed herein, in one embodiment thereof, comprises a color composition forming system for producing a coloring, dying, or staining product for coloring, dying, or staining outdoor landscaping materials. The system includes a color mixer for mixing a coloring material such as a paint, dye or stain, and a non-coloring material such as water, for producing the coloring product. A storage tank stores the coloring product, and a sprayer (i.e. garden pump sprayer) can spray the coloring product onto a landscaping material before installation (i.e. proactively), or can spray the coloring product onto the landscaping material after installation (i.e. retroactively). The coloring product can be recommended by a computer system that includes a recommendation engine for recommending color combinations for landscaping materials.

In this manner, the system of the present invention provides users with a color composition for mulch, rocks and other landscaping materials, and enables users to customize the look of their landscaping materials with ease. A system as described supra, including the mixer, easily produces the desired color composition having a desired viscosity, color and uniformity. Further, the landscaping materials can be dyed or stained proactively before installation, or can be dyed or stained retroactively after installation.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a color composition forming system for producing a coloring or dying product for outdoor landscaping materials. The system further comprises: a color mixer for mixing a coloring material such as a paint, dye or stain, and a non-coloring material such as water, in a fixed ratio for producing the coloring product; a storage tank for storing the produced coloring product; and, a sprayer (i.e. pump sprayer) for spraying the coloring product onto landscaping material before installation or for spraying the coloring product onto the landscaping material retroactively after installation. The color mixer can be an electric paint mixer or can be in the form of a revolving tub having an ergonomic design.

In yet another embodiment, a chemical coloring product for coloring or dying outdoor landscaping materials is disclosed. The chemical coloring or dying product, in one potential embodiment, includes the composition of generally about 50% v/v paint, dye, or stain, and 50% v/v water wherein the paint, dye or stain can be of any color. Volume/volume percentage (v/v percent) is a measure of the concentration of a substance in a solution. It is expressed as the ratio of the volume of the solute to the total volume of the solution multiplied by 100.

In yet another embodiment, a disinfecting coloring product for coloring or dying outdoor landscaping materials is disclosed. The disinfecting coloring product, in another potential embodiment, includes the composition of generally about 48% v/v paint, dye or stain; 48% v/v water; 1% v/v disinfectant; and 1% v/v fragrant agent.

In yet another embodiment of the present invention, the coloring product can be used for dying and coloring mulches, shredded hardwood bark, shredded softwood bark, wood chips, pine straw, sawdust, hulls, lawn clippings, artificial leaves, straw, peat moss, crushed stone and gravel.

In yet another embodiment of the present invention, a computerized color composition forming system for the outdoor landscaping materials is disclosed. The computerized color composition forming system includes: a specialized computer system; the specialized computer system includes I/O device for receiving images of the portion of the home or the business area that requires landscaping; an image processor for processing images of the portion of the home or business area; a recommendation engine for recommending a color combination for the landscaping materials placed in the portion of the home or business area; and a display for displaying the updated images with landscaping materials dyed in the recommended color combinations. The computerized color composition forming system further includes a color mixer for automatically receiving the paint or stain of recommended colors from a paint repository and receives water, or non-coloring agent, in a preconfigured or recommended ratio and a sprayer for spraying the coloring product onto a landscaping material.

In yet another embodiment of present invention, a method of dying a landscaping material is disclosed. The method includes the steps of: introducing a paint or stain of desired color and water, or other non-coloring agent, in a designated proportion in a mixer; transporting the mixed color product into a storage tank; and spraying the color product onto a desired landscaping material.

The present invention provides users with a color or dying composition and system for preparing such color compositions that can be used for mulch, rocks and other landscaping materials, and enables users to customize the look of their landscaping materials with ease. The system can be used to evenly distribute color to the landscaping material before installation (i.e. proactively) or can be applied to the landscaping material after installation (i.e. sprayed on retroactively). The present invention reduces the need to replace worn or weathered landscaping materials, and enables dying of the landscaping materials at reduced cost, increased efficiency and in an environmental friendly manner using the aforementioned coloring or dying methods.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
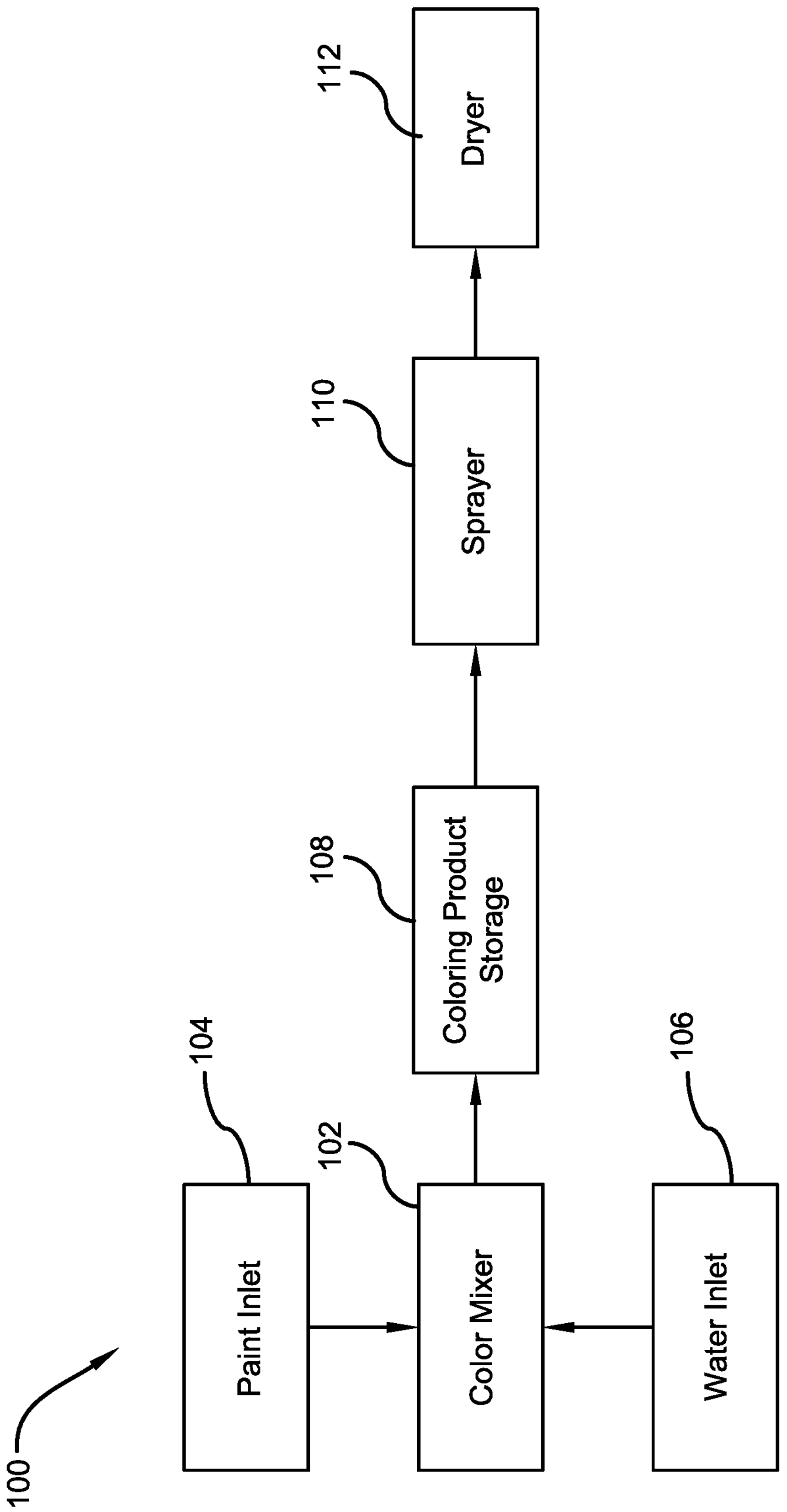
FIG. 1 illustrates a schematic diagram of an exemplary color composition forming system of the present invention used in one potential embodiment in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a solution for enabling users to decorate gardens, homes or business aesthetics in uniform colors. There is also a long felt need in the art for a solution that enables the users to maintain uniform colors for different landscaping materials. Additionally, there is a long felt need in the art for a solution that makes it easy to color and install the landscaping materials with a consistent color, stain or shade. Moreover, there is a long felt need in the art for a solution that enables the users to easily change the look of their landscaping materials as per their desires and requirements. Further, there is a long felt need in the art for a solution that eliminates the need to buy different landscaping materials to periodically change the look of their gardens, outdoor spaces, homes or business aesthetics. Furthermore, there is a long felt need in the art for a solution that enables the users to customize the look of landscaping materials placed in any area in a cost-effective manner. Finally, there is a long felt need in the art for a solution that is easy to use and ensures an aesthetically appealing look for gardens, outdoor spaces, homes or business aesthetics.

The present invention, in one exemplary embodiment, includes a novel computerized color product forming system for outdoor landscaping materials. The computerized color product forming system includes a specialized computer system. The specialized computer system includes an I/O device for receiving images of a portion of the home, outdoor space, or the business area that requires coloring of landscaping materials, an image processor for processing images of the portion of the home or business area, a recommendation engine for recommending a color combination for the landscaping materials placed in the portion of the home, outdoor space, or business area, and a display for displaying the updated images with landscaping materials dyed in the recommended color combinations.

Referring initially to the drawings, FIG. 1 illustrates a schematic diagram of an exemplary color composition forming system of the present invention used in one potential embodiment in accordance with the disclosed architecture. The color composition forming system 100 of FIG. 1 is used for forming a color composition that can be used for coloring outdoor landscaping such as mulch, rocks, gravel, pine straw and more. The system 100 enables users to customize the look of their landscape materials without any professional help. More specifically, the system 100 includes a color mixer 102 that includes a paint, dye or stain inlet 104, and a water or other non-coloring agent inlet 106. The paint inlet 104 and the water inlet 106 can be in the form of buckets or hoses to carry or transfer the paint and the water to the color mixer 102. The color mixer 102 comes in a variety of sizes and designs and includes various capacities to form the color composition by mixing the paint, dye or stain with the non-coloring agent. The color mixer 102 uniformly mixes the non-coloring agent and the paint to form a stable, uniform and consistent coloring product/composition for use in coloring the outdoor landscaping materials. The color mixer 102 can be connected to coloring product storage 108 that stores the coloring product formed by the color mixer 102. The coloring product storage 108 can be in the form of a storage tank that can be detached from the color mixer 102 as per the requirement of the users. In various embodiments, more than one storage tank can be connected to the color mixer 102. For coloring the landscaping materials, a sprayer 110 can be used for spraying the coloring material and the sprayer 110 can be connected to the coloring product storage 108, preferably through a hose. The sprayer 110 can be a pump sprayer (i.e. garden pump sprayer), or an electrically-powered sprayer, that includes a trigger which can be actuated to spray the coloring material from the coloring product storage 108 to the landscaping material. The sprayer 110 used in the color composition forming system 100 can function as a dryer 112 for quickly drying the coloring material sprayed on the landscape materials. A detachable dryer connector can be attached to the sprayer 112 for blowing dry air onto the landscaping materials.

The color mixer 102 can be an electric paint mixer or can be in the form of a revolving tub having an ergonomic design. In one potential embodiment, the color mixer 102 can mix up to 60 liters of paint/dye/stain and water. The color mixer 102 can be automatically operated using a roller or can be held by a user for mixing the paint/dye/stain and the water to form the coloring product.

The color composition forming system 100 of FIG. 1 can be used to color various landscaping materials to give them an appearance of natural landscape and can be used for coloring mulches, shredded hardwood bark, shredded softwood bark, wood chips, pine straw, sawdust, hulls, lawn clippings, artificial leaves, straw, peat moss, crushed stone and gravel.

Figure 2:
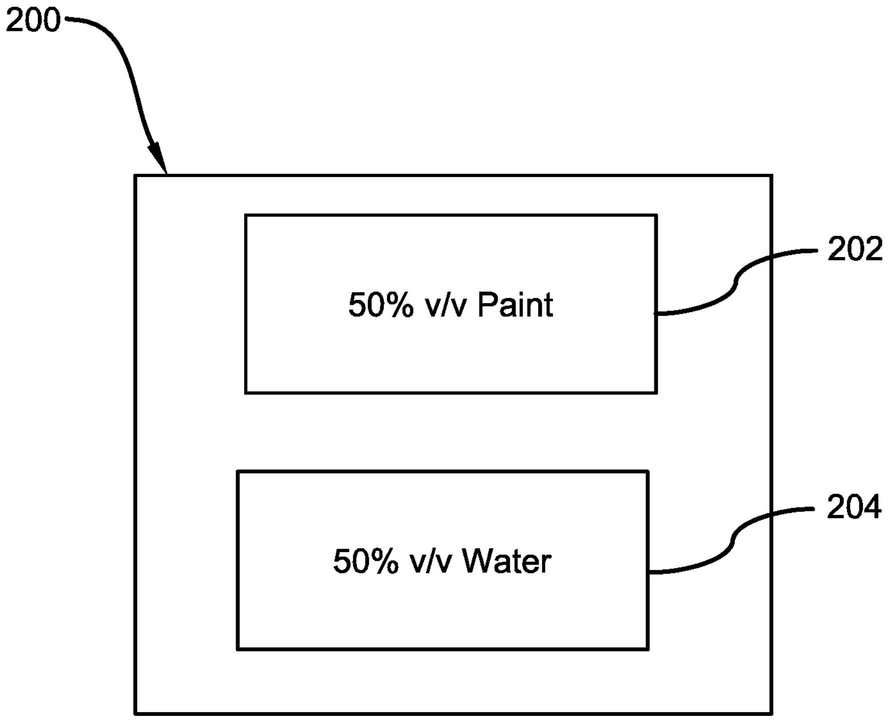
FIG. 2 illustrates an exemplary composition of the coloring product for landscaping materials formed by color composition forming system of FIG. 1 in accordance with the disclosed architecture.

FIG. 2 illustrates an exemplary composition of the coloring product for landscaping materials formed by color composition forming system 100 of FIG. 1 in accordance with the disclosed architecture. The coloring product 200 can include the composition containing from about 30% to about 70% v/v paint, dye or stain 202; and from about 30% to about 70% v/v water 204. The proportioned contents of the paint (i.e. coloring agent) and the water (i.e. non-coloring agent) provides a consistent viscosity and thickness to the coloring product 200. Further, the coloring product 200 can be used with virtually any landscaping material. The coloring product 200 can be applied to the landscaping materials before installation of the materials, or can be sprayed onto the materials retroactively after installation of the materials. The coloring product 200 can have various color shades based on the color of the paint, dye or stain used for forming the coloring product 200.

Figure 3:
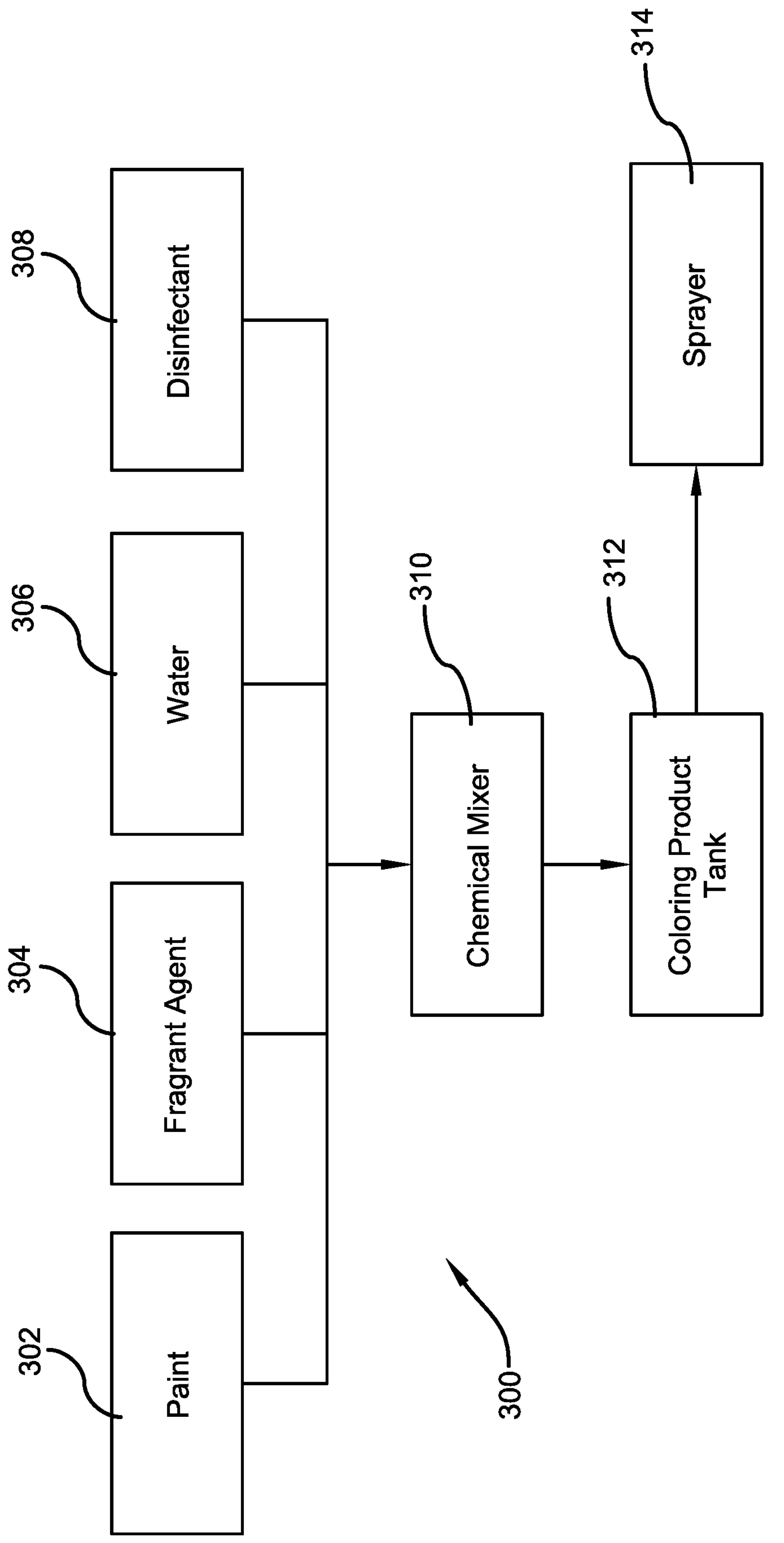
FIG. 3 illustrates a schematic diagram of an alternative color composition forming system of the present invention used in a second potential embodiment in accordance with the disclosed architecture.

FIG. 3 illustrates a schematic diagram of an alternative color composition forming system of the present invention used in a second potential embodiment in accordance with the disclosed architecture. The color composition forming system 300 of FIG. 3 includes a modified color mixer 310 that receives a paint, dye, or stain 302 of any color, a fragrant agent 304, a non-coloring agent (i.e. water) 306 and a disinfectant 308. The color mixer 310 uniformly mixes said contents to form a scented and disinfecting coloring product that also includes disinfectant properties which prevent bugs, germs and other microbes. The coloring product formed by the color mixer 310 can be stored in the coloring product tank 312 and can be sprayed on desired landscaping materials before installation or retroactively after installation using the sprayer 314.

Figure 4:
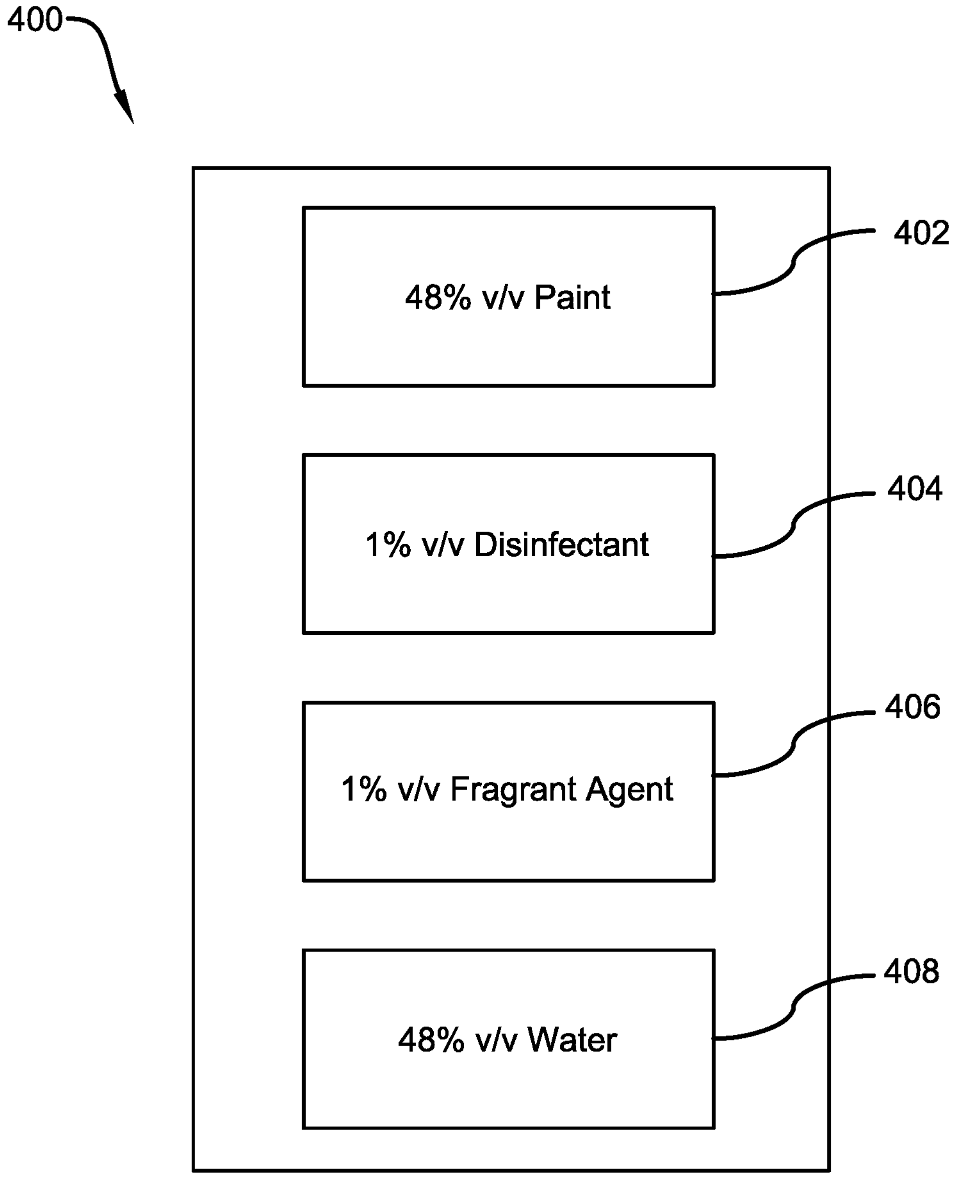
FIG. 4 illustrates an exemplary composition of the disinfecting coloring product for landscaping materials formed by color composition forming system of FIG. 3 in accordance with the disclosed architecture.

FIG. 4 illustrates an exemplary composition of the disinfecting coloring product for landscaping materials formed by the color composition forming system 300 of FIG. 3 in accordance with the disclosed architecture. The coloring product 400 can include the composition containing from about 30% to about 70% v/v coloring agent (i.e. paint) 402, from about 0.5% to about 5% v/v disinfectant 404, from about 0.5% to about 5% v/v fragrant agent 406 and from about 30% to about 70% v/v non-coloring agent (i.e. water) 408. The fragrant agent 406 provides a fragrance that is appealing to the users and the disinfectant 404 provides protection against germs and pathogens. The coloring product 400 can be applied to the landscaping materials before installation on an area or can be sprayed on retroactively after installation. The coloring product 400 can have various color shades based on the color of the paint, dye or stain used for forming the coloring product 400.

The coloring materials 200, 400 prohibit fading and bleaching, and thus enable the landscaping materials to remain aesthetically pleasing for longer periods of time. Further, the coloring materials 200, 400 can be used for coloring mulch, gravel, pine straw and other landscaping materials in homes, outdoor spaces and business areas and can also be used for coloring or dying landscaping fabric placed under mulch or gravel. The presence of water, or another non-coloring agent provides for diluted coloring materials and therefore does not negatively affect the soil.

Figure 5:
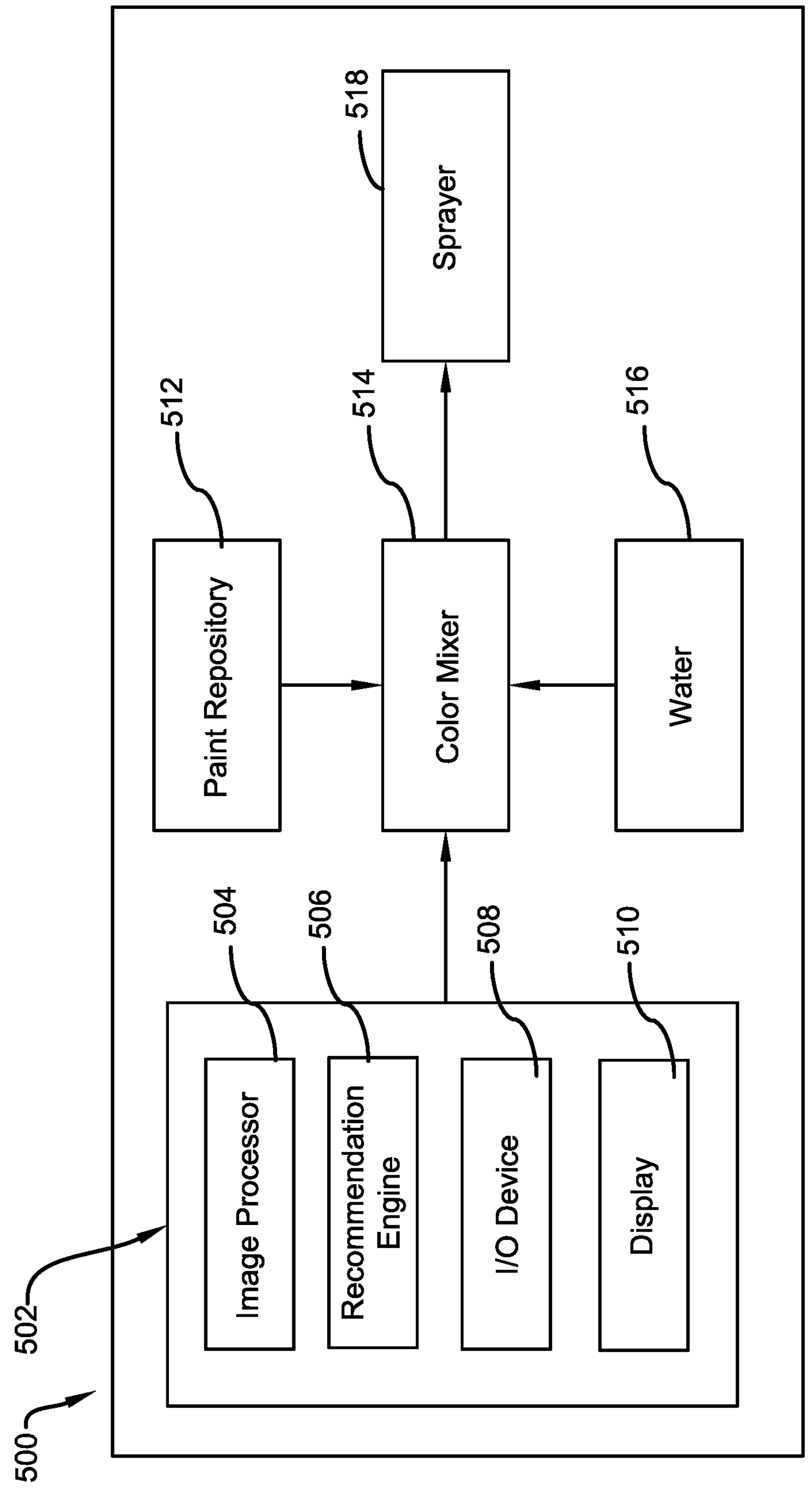
FIG. 5 illustrates a schematic diagram of a computerized color composition forming system of the present invention in accordance with the disclosed architecture.

FIG. 5 illustrates a schematic diagram of a computerized color composition-forming system of the present invention in accordance with the disclosed architecture. The computerized color composition-forming system 500 can use a specialized computer system 502 for recommending color for the landscape materials based on the surroundings of a target area that requires landscaping. More specifically, the specialized computer system 502 includes an image processor 504 that processes images of an area such as of a portion of a home, outdoor space or business area that requires landscaping. The images are received from an I/O device 508, such as a camera, or an image is uploaded to the computer system 502. The image processor 504 scans the image of the target area and identifies the landscaping materials in the image. Based on the color theme of the target area, a recommendation engine 506 recommends a color combination and an updated image with landscape materials 'imagined' with recommended color combination (s) can be displayed on a display 510 of the specialized computer system 502. Once the recommended color combination(s) is approved, the color mixer 514 can automatically receive the paint, dye or stain of recommended colors from the paint repository 512, and can receive water 516 in a preconfigured or recommended volume/volume ratio. The sprayer 518 can spray the mixed coloring material prepared by the color mixer 514 on the desired landscaping materials.

The specialized computer system 502 can be configured to enable the user to upload photographs in picture formats such as, but not limited to, a Joint Photographic Experts Group (JPG), a Portable Network Graphics (PNG), a Graphics Interchange Format (GIF), a Tagged Image File (TIFF), Photoshop Document (PSD) or the like, to the image processor 504.

Figure 6:
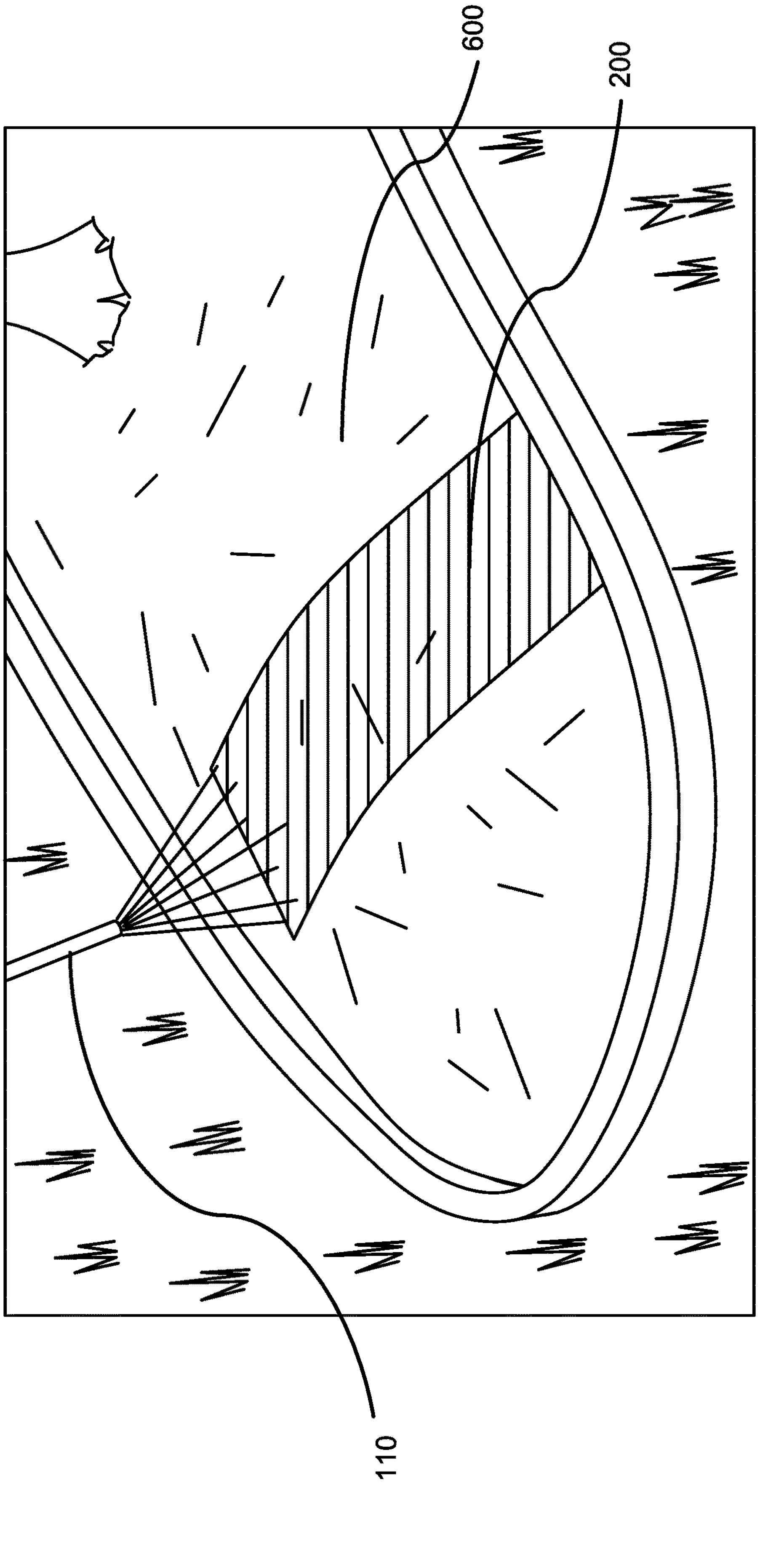
FIG. 6 illustrates a perspective view showing colored, dyed, or stained material sprayed onto mulch using the, for example, pump sprayer (i.e. garden pump sprayer) in accordance with the disclosed architecture.

FIG. 6 illustrates a perspective view showing colored, dyed or stained material sprayed 200 onto mulch using the sprayer 110 in accordance with the disclosed architecture. As shown, for dying mulch 600, the colored, dyed or stained material 200 can be sprayed onto a desired area of the mulch 600 using the sprayer 110. The sprayer 110 enables a precise spray of the colored, dyed or stained material 200. It should be noted that although colored, dyed or stained material 200 is shown as an example in the present embodiment, other disinfecting and colored, dyed or stained material 400, and any other type of colored, dyed or stained material comprising any type of paint and water can be used for dying mulch or any other type of landscaping material. Any type of mulch like organic mulch, inorganic mulch, natural mulch, synthetic mulch, plastic mulch or rubber mulch can be dyed in the present embodiment using the sprayer 110.

Figure 7:
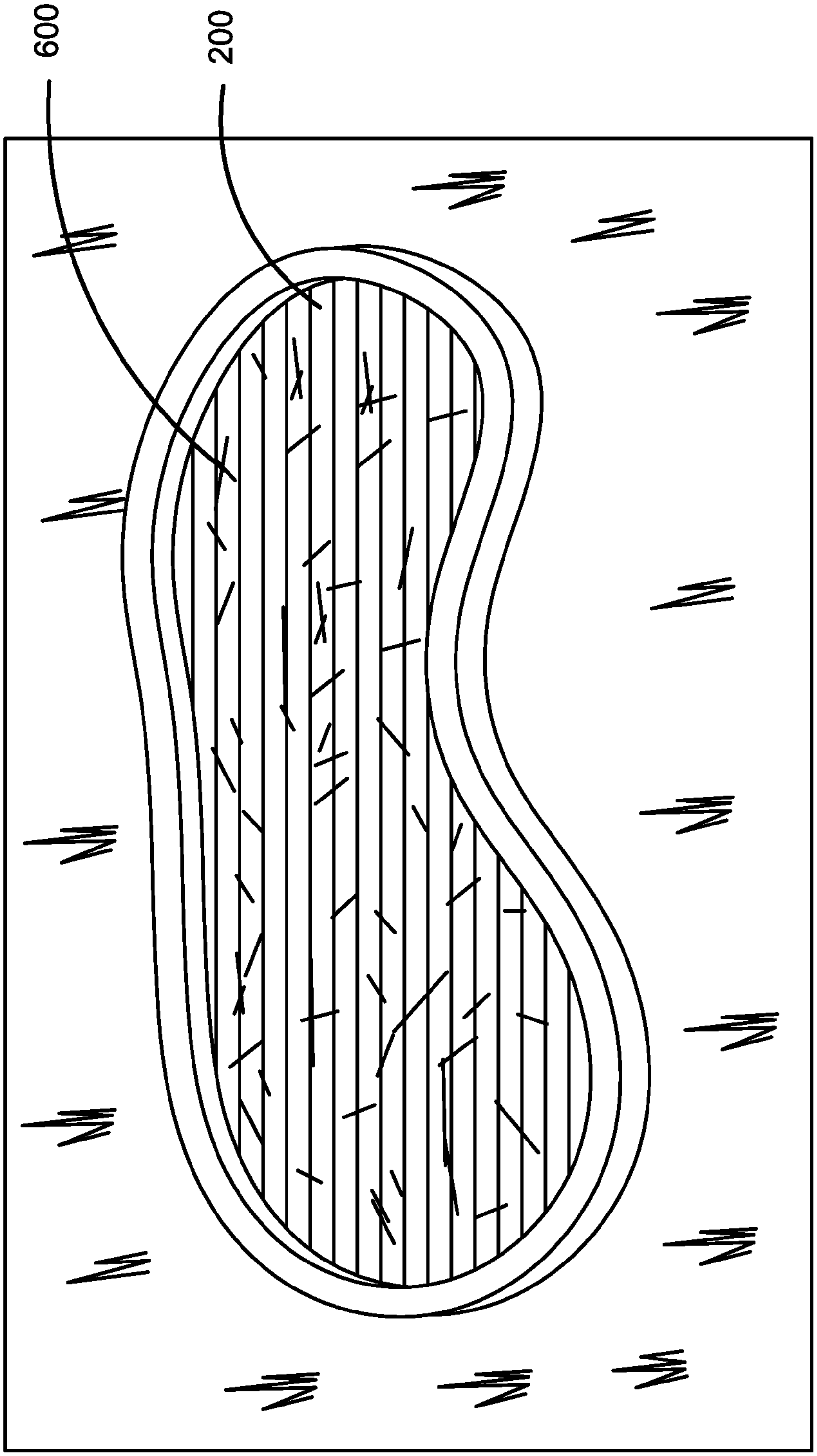
FIG. 7 illustrates a perspective view showing a uniform color applied onto mulch for a desired outdoor landscaping in accordance with the disclosed architecture.

FIG. 7 illustrates a perspective view showing uniform color applied onto mulch for a desired outdoor landscaping in accordance with the disclosed architecture. The coloring product 200 can be applied uniformly over a landscaping material, such as the mulch 600, either before installation or sprayed on retroactively after installation. Uniform colored, dyed or stained landscaping materials can be prepared with ease by users for an aesthetically pleasing look.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "color composition forming system", "alternative color composition forming system", "system", and "computerized color composition forming system" are interchangeable and refer to the color composition forming system 100, 300, 500 of the present invention for landscaping materials.

Notwithstanding the forgoing, the color composition forming system 100, 300, 500 of the present invention can be of any suitable size and configuration as is known in the art without affecting the overall concept of the invention, provided that it accomplishes the above-stated objectives. One of ordinary skill in the art will appreciate that the size, configuration, and material of the color composition forming system 100, 300, 500 as shown in the FIGS. are for illustrative purposes only, and that many other sizes and shapes of the color composition forming system 100, 300, 500 are well within the scope of the present disclosure. Although the dimensions of the color composition forming system 100, 300, 500 are important design parameters for user convenience, the color composition forming system 100, 300, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of coloring of a landscaping material comprising the steps of:

uploading a landscape image to a computer system;

using an image processor to scan a target area in the landscape image to identify the landscaping material in the landscape image;

wherein the landscaping material is non-structural material selected from the type consisting of mulches, shredded hardwood bark, shredded softwood bark, wood chips. pine straw, sawdust, hulls, lawn clippings, artificial leaves, straw, peat moss, crushed stone, and gravel;

using a recommendation engine to recommend a color combination for the landscaping material based on the type of the landscaping material and the surroundings of the target area, wherein the surroundings of the target area is selected from the group consisting of a structural portion of a home, an outdoor space, and a business area;

imaging the recommended color combination for the landscaping material and the surroundings of the target area;

approving the recommended color combination of the landscaping material;

formulating a composition for coloring the landscaping material based on the recommended color combination;

automatically receiving the composition from a repository in a color mixer with the composition comprised of:

a coloring agent, wherein said coloring agent comprises from 30% to 70% by volume of the composition;

a non-coloring agent, wherein said non-coloring agent comprises from 30% to 70% by volume of the composition;

a disinfectant, wherein said disinfectant comprises from 0.5% to 5% by volume of the composition; and a fragrance, wherein said fragrance comprises from 0.5% to 5% by volume of the composition;

transferring the coloring agent into the color mixer via a first inlet;

transferring the non-coloring agent into the color mixer via a second inlet;

mixing the coloring agent, the non-coloring agent, the disinfectant and the fragrance in the color mixer;

attaching the color mixer to a storage container and transferring the composition to the storage container;

connecting a sprayer to the storage container and spraying the composition onto the landscaping material; and attaching a dryer to the sprayer and using the dryer to blow dry the sprayed landscaping material.

2. The method of claim 1, wherein said coloring agent comprises from 40% to 60% by volume of the composition.

3. The method of claim 2, wherein said non-coloring agent comprises from 40% to 60% by volume of the composition.

4. The method of claim 3, wherein said disinfectant comprises from 0.5% to 2% by volume of the composition.

5. The method of claim 4, wherein said fragrance comprises from 0.5% to 2% by volume of the composition.

6. The method of claim 1, wherein said coloring agent comprises from 46% to 54% by volume of the composition.

7. The method of claim 6, wherein said non-coloring agent comprises from 46% to 54% by volume of the composition.

8. The method of claim 7, wherein said disinfectant comprises from 0.5% to 2% by volume of the composition.

9. The method of claim 8, wherein said fragrance comprises from 0.5% to 2% by volume of the composition.

10. The method of claim 9, wherein said coloring agent comprises at least one agent selected from a group consisting of a paint, a dye and a stain.

11. The method of claim 10, wherein said non-coloring agent is a water.

12. The method of claim 11, wherein the composition is in the form of a liquid for dispensing from a pump sprayer.

13. The method of claim 12, wherein said pump sprayer is a garden pump sprayer.

14. The method of claim 11, wherein the composition is in the form of a liquid for dispensing from an electrically powered sprayer.

15. A method of coloring of a landscaping material, comprising the steps of:

uploading a landscape image to a computer system;

using an image processor to scan a target area in the landscape image to identify the landscaping material in the landscape image;

wherein the landscaping material is non-structural material selected from the type consisting of mulches, shredded hardwood bark, shredded softwood bark, wood chips. pine straw, sawdust, hulls, lawn clippings, artificial leaves, straw, peat moss, crushed stone, and gravel;

using a recommendation engine to recommend a color combination for the landscaping material based on the type of landscape material and the surroundings of the target area, wherein the surroundings of the target area is selected from the group consisting of a structural portion of a home, an outdoor space, and a business area;

imaging the recommended color combination for the landscaping material and the surroundings of the target area;

approving the recommended color combination of the landscaping material;

formulating a composition for coloring the landscaping material based on the recommended color combination;

automatically receiving the composition from a repository in a revolving tub color mixer with the composition comprised of:

a coloring agent, wherein said coloring agent comprises from 42% to 58% by volume of the composition and comprises at least one agent selected from a group consisting of a paint, a dye and a stain;

a non-coloring agent, wherein said non-coloring agent comprises from 42% to 58% by volume of the composition and is a water, and further wherein the composition is in the form of a liquid for dispensing from a pump sprayer and is applied to the landscaping material after it is installed;

transferring the coloring agent into the revolving tub color mixer via a first inlet;

transferring the non-coloring agent into the revolving tub color mixer via a second inlet;

mixing the coloring agent and the non-coloring agent in the revolving tub color mixer;

attaching the revolving tub color mixer to a storage container and transferring the composition to the storage container;

connecting a sprayer to the storage container and spraying the composition onto the landscaping material; and attaching a dryer to the sprayer and using the dryer to blow dry the sprayed landscaping material.

16. The method of claim 15, wherein the composition further comprises a disinfectant that is from 0.5% to 1.5% by volume of the composition.

17. The method of claim 16, wherein the composition further comprises a fragrance that is from 0.5% to 1.5% by volume of the composition.

18. The method of claim 17, wherein said coloring agent comprises from 46% to 54% by volume of the composition.

19. The method of claim 18, wherein said non-coloring agent comprises from 46% to 54% by volume of the composition.

* * * * *